United States Patent
Haney et al.

(10) Patent No.: US 12,454,339 B2
(45) Date of Patent: Oct. 28, 2025

(54) LINEAR ACTUATOR

(71) Applicant: Brunswick Corporation, Mettawa, IL (US)

(72) Inventors: Trevor R. Haney, Jenison, MI (US); Kevin T. Downey, Rockford, MI (US); Tyler J. Dally, Grand Rapids, MI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 18/322,205

(22) Filed: May 23, 2023

(65) Prior Publication Data

US 2024/0391576 A1 Nov. 28, 2024

(51) Int. Cl.
*B63H 20/10* (2006.01)
*F16L 3/015* (2006.01)

(52) U.S. Cl.
CPC .............. *B63H 20/10* (2013.01); *F16L 3/015* (2013.01)

(58) Field of Classification Search
CPC ......... B63B 39/061; B63H 20/10; F16L 3/015
USPC ................................................. 114/285–287
See application file for complete search history.

(56) References Cited

U.S. PATENT DOCUMENTS

| | | | |
|---|---|---|---|
| 5,474,013 A | 12/1995 | Wittmaier | |
| 6,273,771 B1 | 8/2001 | Buckley et al. | |
| 6,354,237 B1 | 3/2002 | Gaynor et al. | |
| 7,575,491 B1 | 8/2009 | Martin | |
| 8,047,152 B2 * | 11/2011 | Gai | B63B 1/22 114/286 |
| 9,278,740 B1 | 3/2016 | Andrasko et al. | |
| 9,771,134 B2 | 9/2017 | Gai et al. | |
| 11,155,322 B2 * | 10/2021 | Baros | H02K 7/06 |
| 11,384,820 B2 * | 7/2022 | Jørgensen | F16H 25/24 |

FOREIGN PATENT DOCUMENTS

FR   1520327 A   4/1968

OTHER PUBLICATIONS

Lenco Marine Inc., Lenco Product Catalog, 2023, pp. 1-19 and 36-43.
Deuel et al., "Electric Linear Actuator With Position Sensing", U.S. Appl. No. 17/716,542, filed Apr. 8, 2022 (drawings, specification, and claims only).
Lenco Marine Inc., Lenco Owner's Manual, May 21, 2019.

(Continued)

*Primary Examiner* — Ajay Vasudeva
(74) *Attorney, Agent, or Firm* — Andrus Intellectual Property Law, LLP

(57) ABSTRACT

A linear actuator has a mounting bracket with a mounting flange configured to be coupled to a first component and a clevis comprising a pair of forks. A housing has a first end configured to be pivotably coupled to the clevis forks. A rod extends from a second end of the housing and is configured to be coupled to a second component. A cable extends from the first end of the housing and is routed between the clevis forks and through an opening in the mounting flange. A hood on the mounting bracket extends from the mounting flange at least partially along the clevis forks so as to cover at least part of the cable. A shroud extends past the first end of the housing and also covers at least part of the cable.

15 Claims, 9 Drawing Sheets

(56) References Cited

OTHER PUBLICATIONS

Dometic Group AB, Dometic STT3131R Standard Trim Tab Kit, Standard Mount, https://www.dometic.com/en-us/outdoor/boat/marine-control/trim-tabs/dometic-stt3131r-308641, accessed Apr. 29, 2023.
Dometic Corporation, Dometic Standard Trim Tab System Operating and Installation Manual, 2021, pp. 1, 4, 9-17, 20, 21.
Applicant's Admitted Prior Art, photographs of Dometic and Lenco trim tab actuators.
European Search Report in EP Application No. 24177257.3, issued Nov. 14, 2024, 8 pages.

* cited by examiner

LINEAR ACTUATOR

FIELD

The present disclosure relates to linear actuators, such as for example actuators for trim tabs on boats.

BACKGROUND

Electric linear actuators are used to actuate trim tabs coupled to a transom of a boat. A first end of a housing of the actuator is coupled to the boat and a rod extending from the opposite end of the housing is coupled to the trim tab. The actuator's motor is provided with electrical power from a power supply on the boat by way of a cable. When power is supplied to the motor in response to an operator input, the actuator's internal assemblies cause the rod to extend from or retract into the housing to trim the trim tab down or up, respectively.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a linear actuator comprises a housing having a first end configured to be coupled to a first component and a rod configured to extend from a second end of the housing and configured to be coupled to a second component. A cable extends from the first end of the housing. A shroud extends past the first end of the housing and covers at least part of the cable.

According to some examples, a pivot ear is coupled to the first end of the housing. The pivot ear is configured for pivotable attachment to a mounting bracket configured to couple the first end of the housing to the first component. According to some examples, the shroud is integral with the pivot ear. According to some examples, the pivot ear comprises a lower end connected to the first end of the housing and an upper surface opposite the lower end. A channel is formed in the upper surface of the pivot ear. The channel is configured to receive the cable.

According to some examples, the housing comprises a longitudinal side surface connecting the first and second ends of the housing. According to some examples, the shroud is an extension of the longitudinal side surface. According to some examples, a pivot car has a lower end connected to the first end of the housing and an upper surface opposite the lower end. The pivot car is configured for pivotable attachment to a mounting bracket configured to couple the first end of the housing to the first component. The cable is aligned over the upper surface of the pivot car. The shroud is aligned with the cable and the pivot car.

According to some examples, the linear actuator further comprises a mounting bracket. The mounting bracket comprises a mounting flange configured to be coupled to the first component and a clevis comprising a pair of forks pivotably coupled to the first end of the housing. The cable is routed between the clevis forks and through an opening in the mounting flange. A hood extends from the mounting flange at least partially along the clevis forks so as to cover at least part of the cable. According to some examples, the mounting flange comprises a first face configured to be attached adjacent to the first component and an opposite second face. The hood extends outwardly past the second face of the mounting flange.

According to some examples, the linear actuator is a trim tab actuator, the first component is a boat, and the second component is a trim tab.

According to another example of the present disclosure, a linear actuator comprises a mounting bracket comprising a mounting flange configured to be coupled to a first component and a clevis comprising a pair of forks. A housing has a first end configured to be pivotably coupled to the clevis forks. A rod is configured to extend from a second end of the housing and is configured to be coupled to a second component. A cable extends from the first end of the housing and is routed between the clevis forks and through an opening in the mounting flange. A hood on the mounting bracket extends from the mounting flange at least partially along the clevis forks so as to cover at least part of the cable.

According to some examples, a shroud extends past the first end of the housing and covers at least part of the cable.

According to some examples, a pivot car pivotably couples the first end of the housing to the clevis forks and the shroud is integral with the pivot car. According to some examples, the pivot car comprises a lower end connected to the first end of the housing and an upper surface opposite the lower end. A channel is formed in the upper surface of the pivot ear and the channel is configured to receive the cable.

According to some examples, the housing comprises a longitudinal side surface connecting the first and second ends of the housing and the shroud is an extension of the longitudinal side surface. According to some examples, a pivot ear pivotably couples the first end of the housing to the clevis forks. The pivot ear has a lower end connected to the first end of the housing and an upper surface opposite the lower end. The cable is aligned over the upper surface of the pivot ear and the shroud is aligned with the cable and the pivot ear.

According to some examples, the mounting flange comprises a first face configured to be attached adjacent to the first component and an opposite second face. The hood extends outwardly past the second face of the mounting flange.

According to some examples, the linear actuator is a trim tab actuator, the first component is a boat, and the second component is a trim tab.

According to another example of the present disclosure, a mounting bracket for a trim tab actuator comprises a mounting flange having a first face configured to be coupled adjacent a mounting surface. A clevis comprising a pair of forks projects from an opposite second face of the mounting flange. A hood extends from the mounting flange at least partially along the clevis forks. A hole in the mounting flange is between the clevis forks and extends from the first face to the second face of the mounting flange. The mounting bracket is configured such that a cable of the trim tab actuator can pass between the clevis forks and through the hole in mounting flange. The hood is configured to cover at least part of the cable.

According to some examples, the hood extends outwardly past the second face of the mounting flange. According to some examples, the hood extends along at least 20% of a total length of the clevis forks.

According to some examples, the clevis forks are configured to be pivotably coupled to a pivot ear on an end of the trim tab actuator.

BRIEF DESCRIPTION OF THE DRAWINGS

The present disclosure is described with reference to the following Figures. The same numbers are used throughout the Figures to reference like features and like components.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Figure 1:
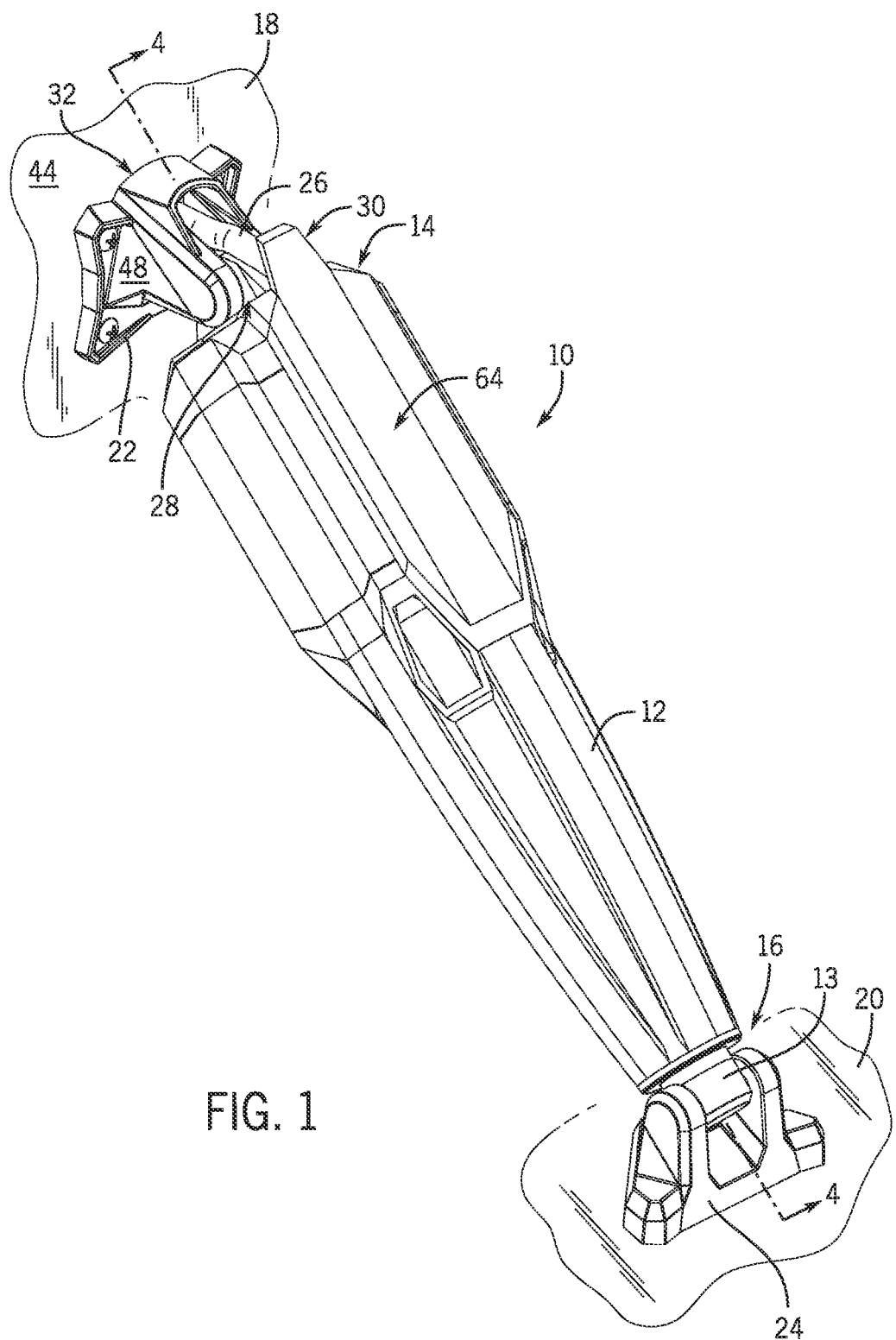
FIG. 1 is a first perspective view of a linear actuator according to the present disclosure.
Figure 2:
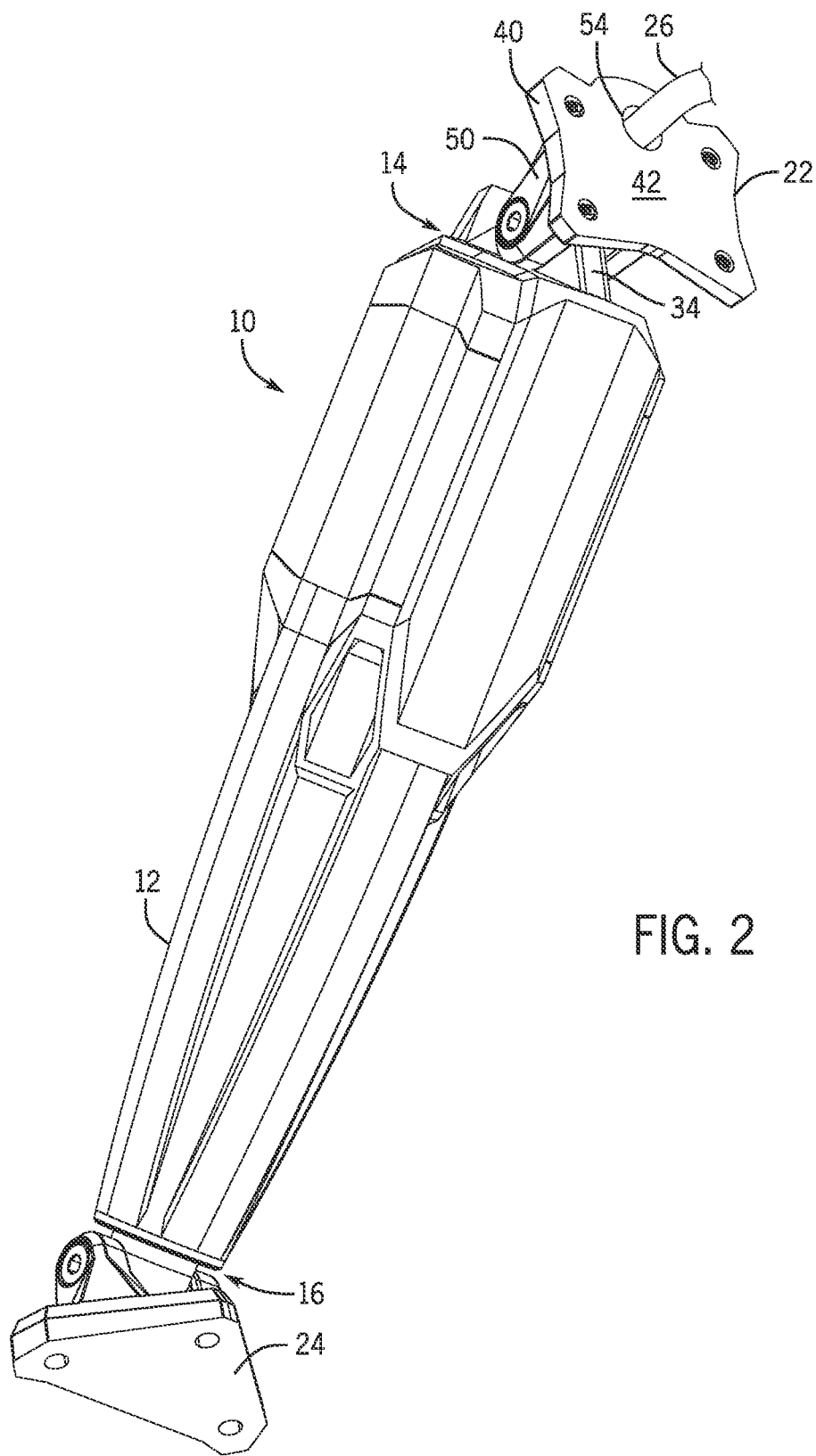
FIG. 2 is an opposite perspective view of the linear actuator.

FIG. 1 shows a first perspective view of a linear actuator 10, while FIG. 2 shows an opposite perspective view thereof. The linear actuator 10 has a housing 12 having a first end 14 configured to be coupled to a first component 18. The linear actuator also has a rod 13 configured to extend from a second end 16 of the housing 12 and configured to be coupled to a second component 20. According to one non-limiting example, the linear actuator 10 is a trim tab actuator, the first component 18 is a boat, and the second component 20 is a trim tab. For connection to the first component 18 (e.g., a transom of a boat), the linear actuator 10 includes an upper mounting bracket 22. The linear actuator 10 also includes a lower mounting bracket 24 for attachment to the second component 20 (e.g., a trim tab). The upper and lower mounting brackets 22, 24 may be attached to the first and second components 18, 20 in any known manner, such as by fasteners including screws, adhesives, or the like.

Those having ordinary skill in the art are familiar with how an electric linear trim tab actuator functions. The housing 12 holds a motor, optional gearset, and spindle, which together work to extend the rod 13 out of the housing 12 or retract the rod 13 into the housing 12 in response to operator commands (e.g., from a trim switch). As the rod 13 extends from the housing 12, the trim tab (second component 20) pivots away from the transom of the boat (first component 18). The motor of the trim tab actuator 10 requires electrical power, which is typically provided by a battery or other power source on the boat. Thus, a means for connecting the motor, which is external to the transom, to the battery, which is on the boat, is required. To that end, the linear actuator 10 includes a cable 26 extending from the first end 14 of the housing 12, which cable is routed through the mounting bracket 22 and a hole in the transom for eventual connection to the battery on the boat.

The present inventors recognized that current electric linear actuators for trim tabs have electrical cables that hang loose, are exposed, and are easily pinched or cut by the actuator's moving parts. Current products also require that a hole be cut into the transom of the boat in a location that is visible or exposed even after the trim tab is installed. Thus, the present inventors have developed several elements that work alone or together to guide the cable 26 in a secure manner into the transom, as well to as hide a significant portion of the cable 26 from sight after the trim tab is installed. Specifically, the present inventors have developed a shroud 28 on a pivot car 34 of the actuator, a shroud 30 on the housing 12 of the actuator 10, and a hood 32 on the upper mounting bracket 22, each of which may be used alone or in various combinations together, to hide portions of the cable 26 from view.

Figure 3:
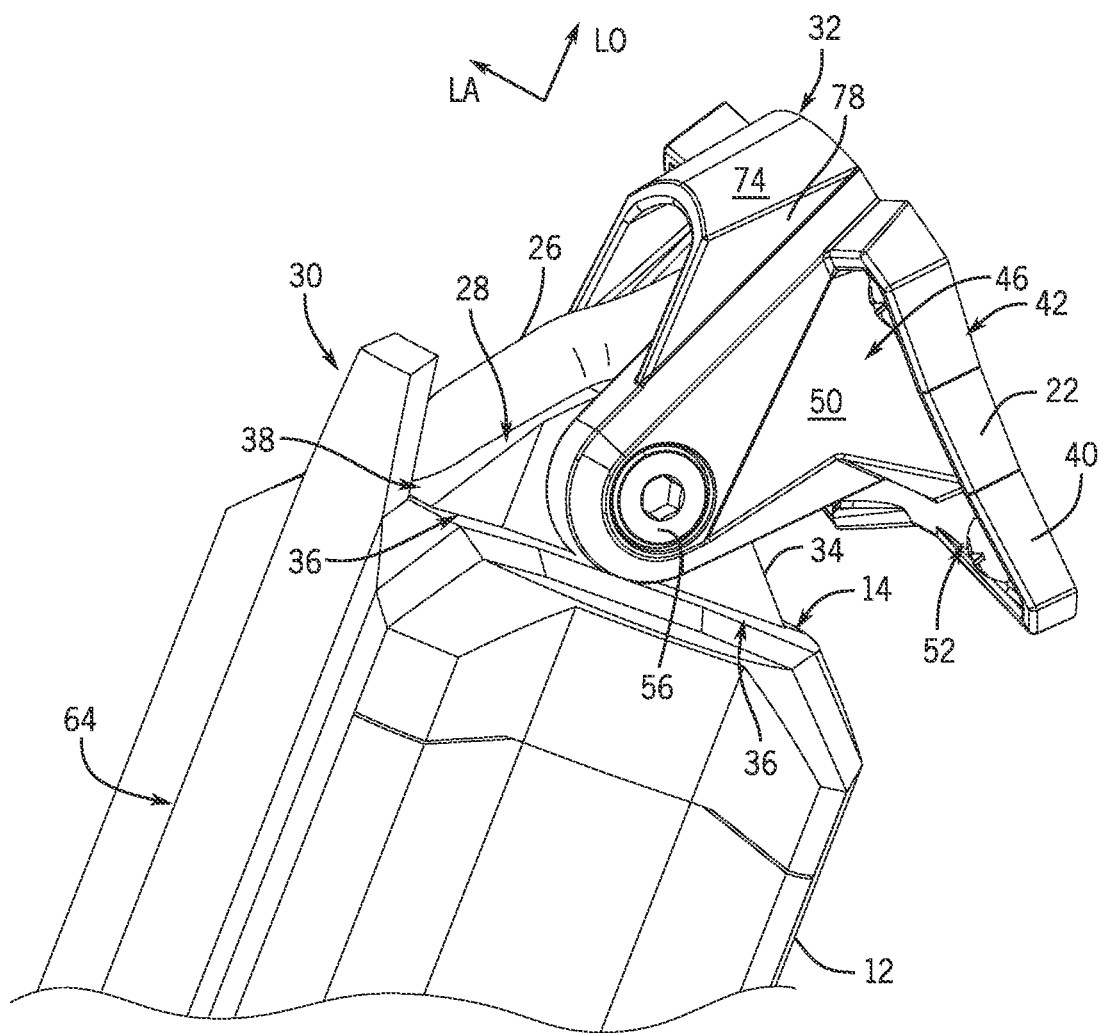
FIG. 3 is a perspective view of an upper end of the linear actuator.

FIG. 3 shows both of the shrouds 28, 30, each of which shroud extends past the first end 14 of the housing 12 and covers at least part of the cable 26. In order to explain the shrouds 28, 30 fully, the pivot car 34 and mounting bracket 22 will first be described.

The pivot car 34 is coupled to the first end 14 of the housing 12. In one example, the pivot car 34 is integrally formed with the housing 12, but in other examples the pivot car 34 is attached to the housing 12 in a separate manufacturing step. The pivot car 34 is best understood with reference to FIGS. 3 and 5, the latter of which is a close-up view of the upper portion of FIG. 4. The pivot car 34 comprises a lower end 36 connected to the first end 14 of the housing 12 and an upper surface 38 opposite the lower end 36. The pivot car 34 is configured for pivotable attachment to the mounting bracket 22, which in turn is configured to couple the first end 14 of the housing 12 to the first component 18.

Figure 5:
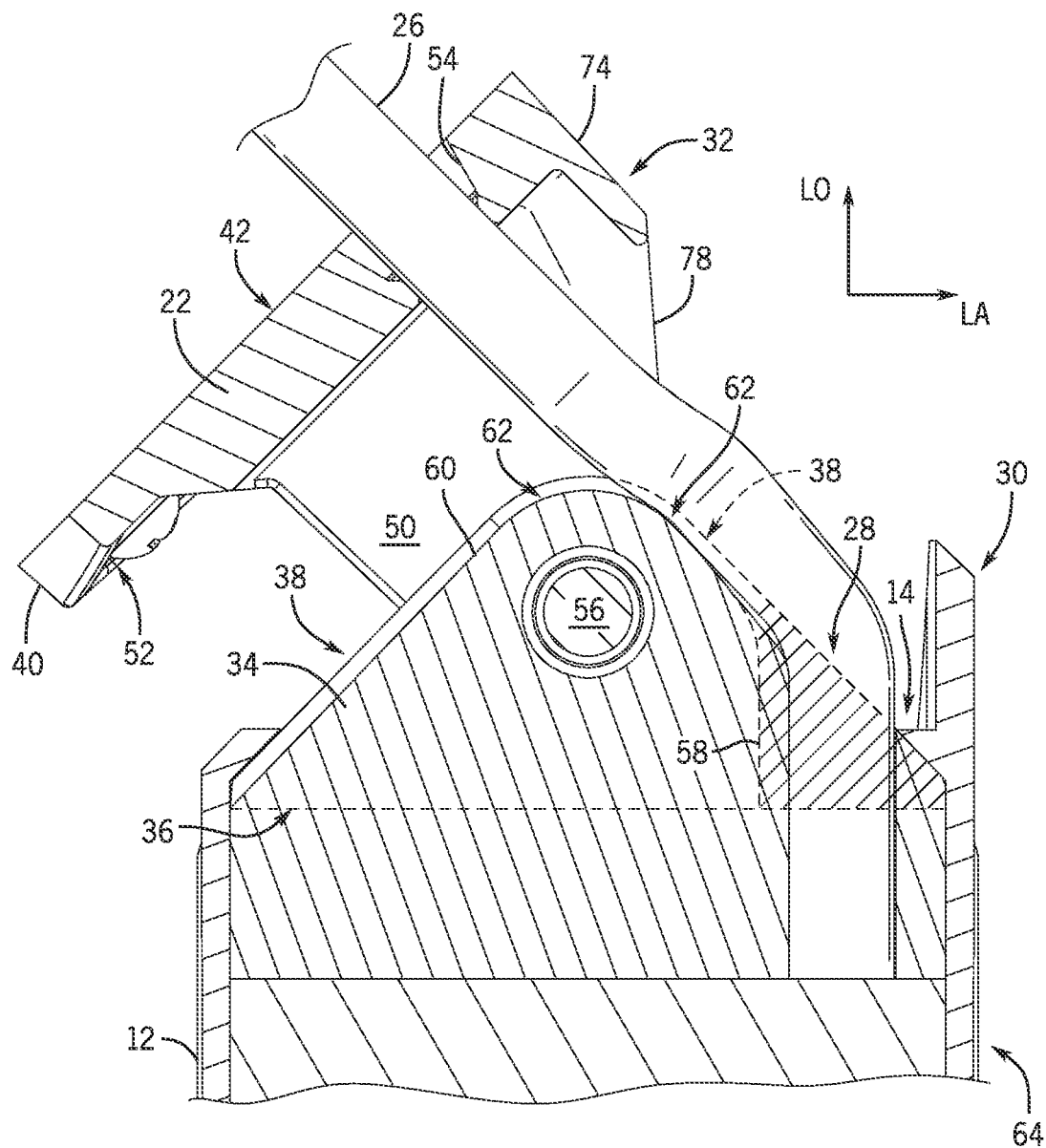
FIG. 5 is a detailed view of a portion of FIG. 4.
Figure 6:
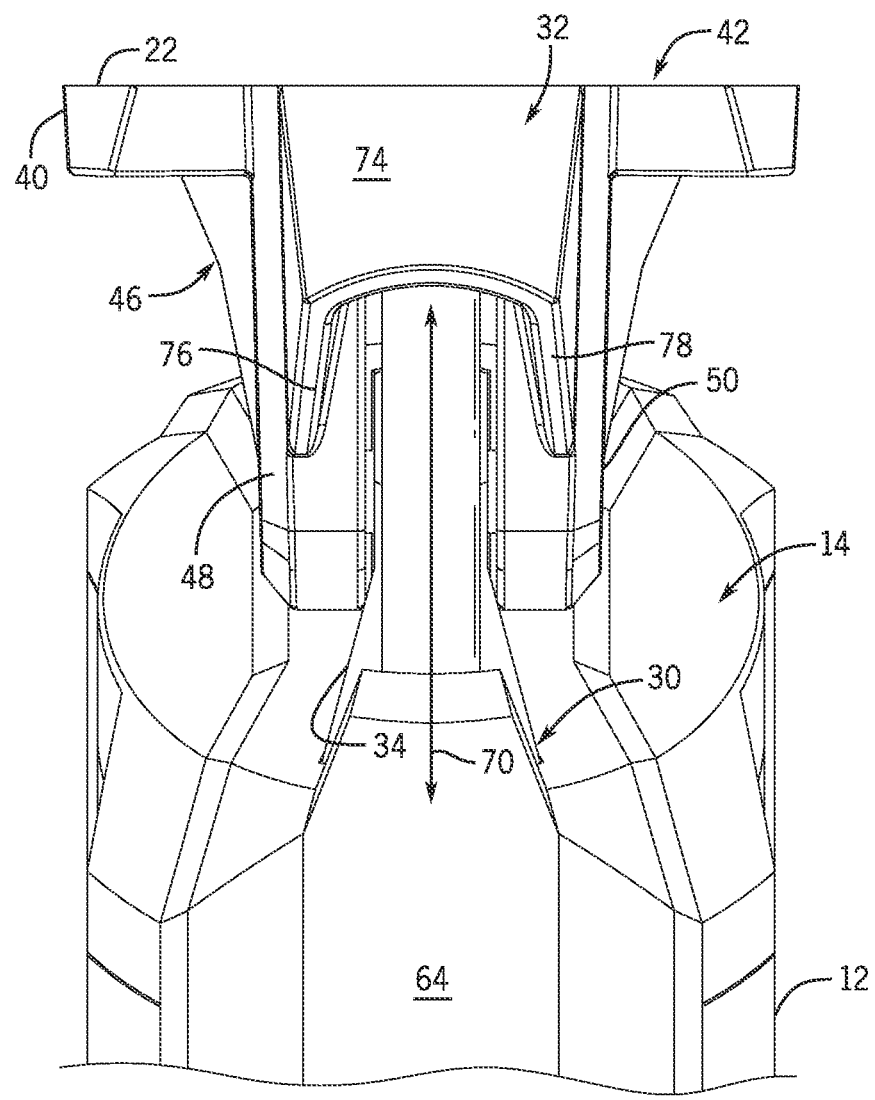
FIG. 6 is a top perspective of an upper portion of the linear actuator.

Referring to FIGS. 3, 5, and 6, the mounting bracket 22 has a mounting flange 40 configured to be coupled to the first component 18. The mounting flange 40 has a first face 42 (see also FIG. 2) configured to be coupled adjacent a mounting surface 44 (FIG. 1), which may be the surface of the first component 18. A clevis 46 comprising a pair of forks 48, 50 projects from an opposite second face 52 of the mounting flange 40. An opening or hole 54, best shown in FIG. 5, is provided in the mounting flange 40 between the clevis forks 48, 50, the hole 54 extending from the first face 42 to the second face 52 of the mounting flange 40. The mounting bracket 22 is configured such that the cable 26 of the trim tab actuator 10 can pass between the clevis forks 48, 50 and through the hole 54 in the mounting flange 40. When installed on the transom (first component 18), the mounting bracket 22 therefore covers the hole made in the transom to accommodate the cable 26.

Figure 8:
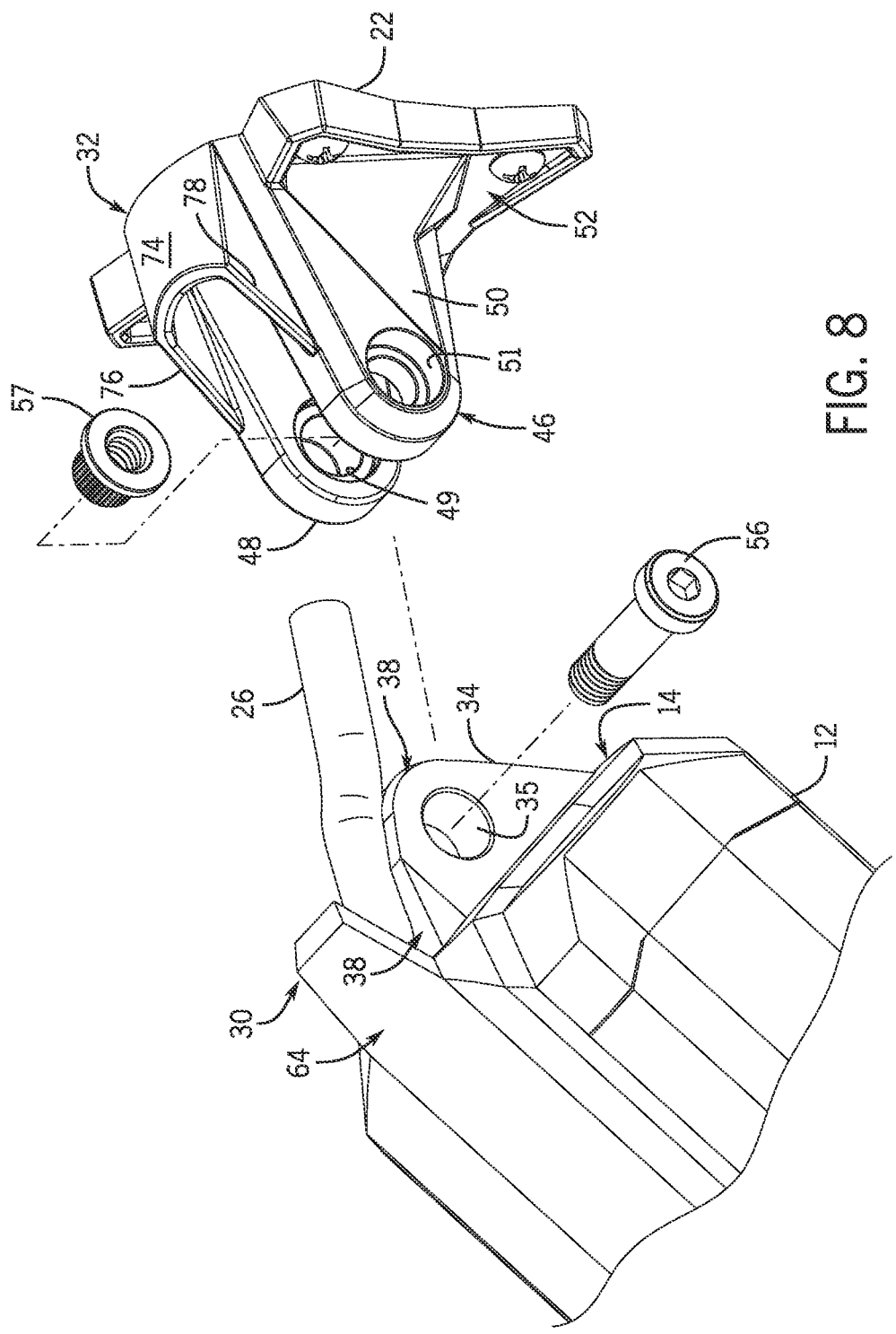
FIG. 8 is an exploded view of an upper portion of the linear actuator.

The first end 14 of the housing 12 of the actuator 10 is configured to be pivotably coupled to the clevis forks 48, 50 by way of the pivot car 34. Referring briefly to FIG. 8, to facilitate such attachment, the clevis forks 48, 50 are aligned on either side of the pivot car 34 and a bolt 56 is passed through coaxially aligned holes 49, 51 in the clevis forks 48, 50 and a hole 35 in the pivot car 34 and secured with a nut 57. The pivot car 34 and thus the actuator housing 12 to which the pivot car 34 is coupled, rotate about the bolt 56 as the rod 13 extends or retracts from the housing 12 to move the second component 20 with respect to the first component 18.

With reference to FIGS. 3 and 5, one example of the shroud 28 is integral with the pivot car 34. In fact, the shroud 28 is formed by the shape and dimensioning of the pivot car 34, which extends much further in the lateral direction LA and longitudinal direction LO than known pivot cars on trim tab actuators. For example, known pivot cars typically have a lateral extent as shown by the dashed line 58 in FIG. 5. Thus, the generally triangular area shaded in FIG. 5 is a portion of the pivot car 34 that acts as a shroud 28 to at least partially cover the cable 26. This triangular portion extends past the first end 14 of the housing 12 to cover the cable 26 in contrast to prior designs, in which the cable is uncovered from where is exits the plane of the first end of the housing.

Figure 9:
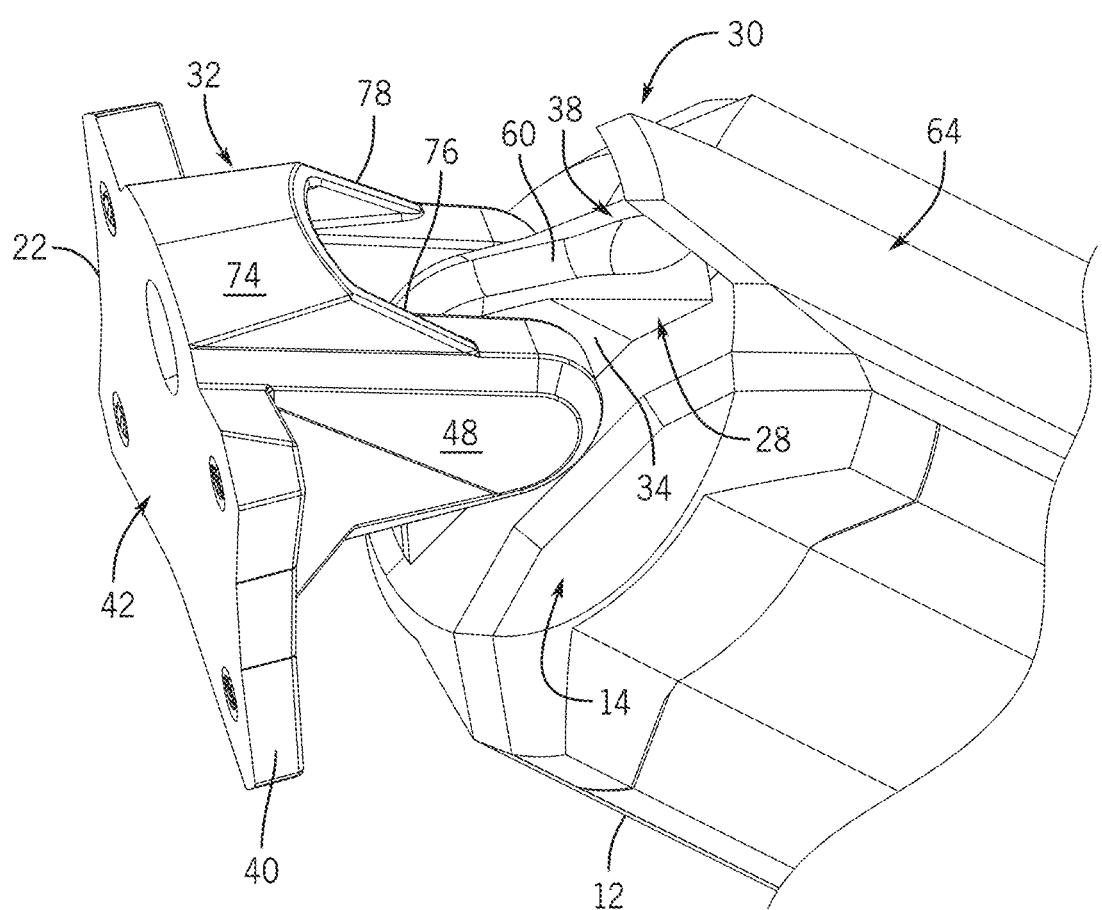
FIG. 9 is a perspective view of an upper portion of the linear actuator without a cable connected thereto.

The pivot car 34 is further configured to hold the cable 26 more securely than in known prior art designs. As shown in FIGS. 5 and 9, a channel 60 is formed in the upper surface 38 of the pivot ear 34. The channel 60 is as deep as the difference between the very upper surface 38 of the pivot car 34 and the bottom surface 62 of the channel 60. The channel 60 is configured to receive the cable 26 therein. As the housing 12 pivots with respect to the mounting bracket 22 about the bolt 56, the cable 26 is guided over the top of the pivot car 34 in both the longitudinal LO and lateral LA directions within the channel 60. This ensures that the cable 26 does not become unaligned and get stuck between the clevis forks 48, 50 and the pivot car 34. The channel 60 to some extent also hides the cable 26 from view.

Figure 4:
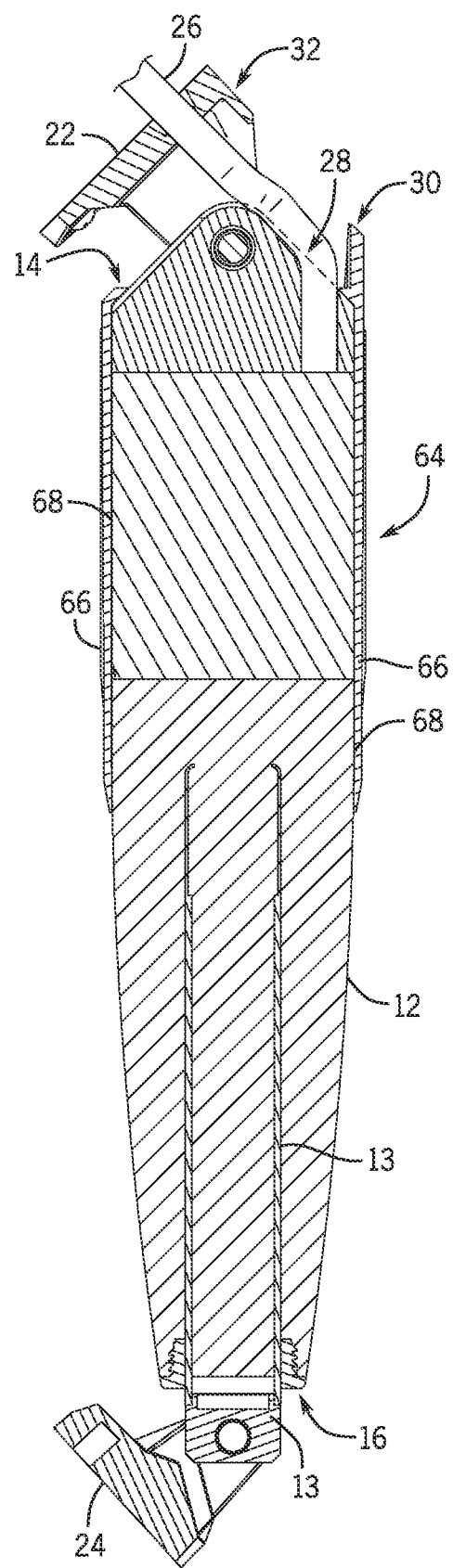
FIG. 4 is a cross-section taken along the line 4-4 in FIG. 1.

Still with reference to FIGS. 3 and 5, another example of the shroud 30 will be described. Note that the housing 12 comprises a longitudinal side surface 64 connecting the first and second ends 14, 16 of the housing 12 (see also FIG. 1). Referring briefly to FIG. 4, the longitudinal side surface 64 may be an outer surface of a cover 66 of the housing 12, which housing cover 66 is provided over a main body 68 of the housing 12. Alternatively, the longitudinal side surface 64 may be the outer surface of the main body 68 in an example in which no cover is provided. In either case, the shroud 30 is an extension of the longitudinal side surface 64. The shroud 30 extends past the first end 14 of the housing 12 and covers at least part of the cable 26. For instance, as the trim tab actuator 10 will most typically be seen from behind the boat, the shroud 30 hides the cable 26 from view when the actuator 10 is viewed from the rear (see FIG. 6).

As shown in FIGS. 3, 5, and 6, the cable 26 is aligned over the upper surface 38 of the pivot car 34, more specifically within the channel 60 in the upper surface 38. The shroud 30 is aligned with the cable 26 and the pivot car 34. In other words, referring to FIG. 6, the shroud 30, cable 26, and pivot ear 34 all align along line 70. This ensures the shroud 30 at least partially covers the cable 26 when viewed from the rear. Although the shroud 30 is shown as extending only along the rear-facing side of the cable 26, in other examples, the shroud 30 could curve around the side surfaces of the cable 26 to further hide the cable 26 from view. The extent to which the shroud 30 extends past the first end 14 of the housing 12 will depend on the maximum allowed pivot angle of the housing 12 with respect to the mounting bracket 22 as well as the geometry of the mounting bracket 22 itself, as the shroud 30 should not interfere with the mounting bracket 22 when the housing 12 is pivoted to its maximum allowed angle in the counterclockwise direction in FIG. 5 (i.e., the maximum trimmed up position).

As noted herein above, the mounting bracket 22 comprises the clevis 46 having the pair of forks 48, 50 pivotably coupled to the first end 14 of the housing 12 by way of the pivot car 34. The cable 26 is routed between the clevis forks 48, 50 and through an opening or hole 54 in the mounting flange 40 of the mounting bracket 22. As shown in FIGS. 3 and 5-7, a hood 32 extends from the mounting flange 40 at least partially along the clevis forks 48, 50 so as to cover at least part of the cable 26. As noted, the mounting flange 40 comprises the first face 42 configured to be attached adjacent to the first component 18 and an opposite second face 52. The hood 32 extends outwardly past the second face 52 of the mounting flange 40.

Figure 7:
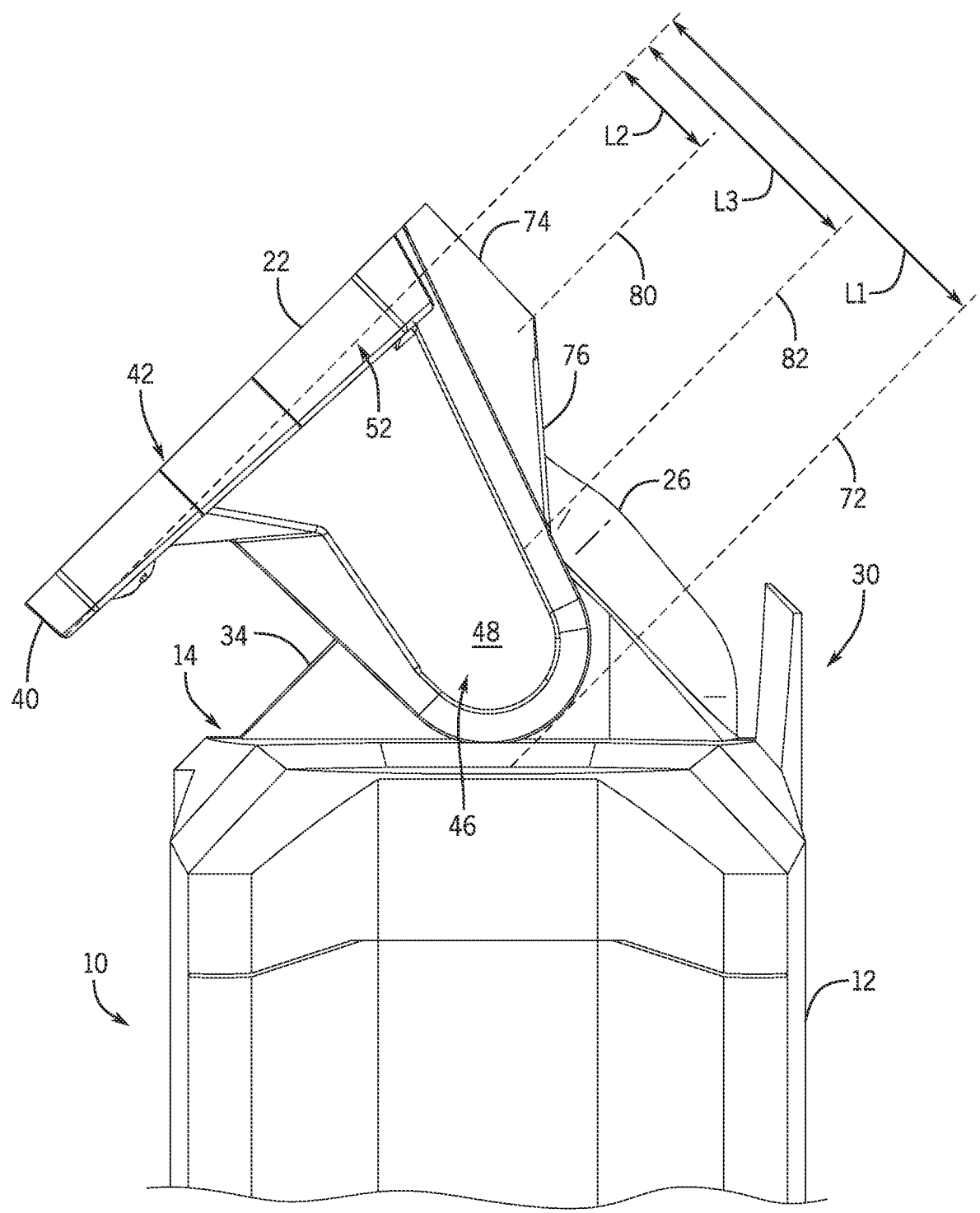
FIG. 7 is a side profile view of an upper portion of the linear actuator.

The hood 32 therefore is more than simply a structural feature required to connect the clevis forks 48, 50 to the mounting flange 40. Rather, the hood 32 is specifically designed to project over the cable 26 as much as possible without interfering with the shroud 30 when the housing 12 is pivoted to its maximum allowed angle in the counterclockwise direction in FIG. 5 (i.e., the maximum trimmed up position). FIG. 7 shows a portion of the actuator 10 in profile in order to illustrate the design of the hood 32. The first face 42 and opposite second face 52 of the mounting flange 40 are shown. Note that the second face 52 is shown in phantom, as it is not viewable in FIG. 7 due to a lip provided on the mounting flange 40 and due to the structure of the mounting bracket 22 that transitions into the clevis 46. The total length of the clevis forks 48, 50, measured from the second face 52, is denoted by the dashed line 72. The hood 32 has an upper portion 74 and opposed tapered portions 76, 78. The extent of the upper portion 74, measured from the second face 52, is shown by the line 80. The extent of the tapered portions 76, 78, measured from the second face 52, is shown by the line 82. According to the present example, the hood 32 extends along at least 20% of a total length L1 of the clevis forks 48, 50 (wherein L1 is measured from second face 52 to line 72). The extent of the hood 32 here refers to the extent of the upper portion 74 of the hood 32, the dimension of which is denoted L2 (wherein L2 is measured from second face 52 to line 80). The tapered portions 76, 78 extend along the clevis forks 48, 50, respectively, by at least 50% of the total length L1 of the clevis forks 48, 50, as shown by L3 (wherein L3 is measured from second face 52 to line 82). The tapered nature of the hood 32 allows the side surfaces of the cable 26 to be covered, while the upper portion 74 of the hood 32 is prevented from contact with the shroud 30 when the actuator is pivoted to its maximum trimmed up position.

In the above description, certain terms have been used for brevity, clarity, and understanding. No unnecessary limitations are to be inferred therefrom beyond the requirement of the prior art because such terms are used for descriptive purposes and are intended to be broadly construed. The order of method steps or decisions shown in the Figures and described herein are not limiting on the appended claims unless logic would dictate otherwise. It should be understood that the decisions and steps can be undertaken in any logical order and/or simultaneously. The different systems and methods described herein may be used alone or in combination with other systems and methods. It is to be expected that various equivalents, alternatives and modifications are possible within the scope of the appended claims.

What is claimed is:

1. A linear actuator comprising:
   a housing having a first end configured to be coupled to a first component;
   a rod configured to extend from a second end of the housing and configured to be coupled to a second component;
   a cable extending from the first end of the housing; and
   a pivot ear coupled to the first end of the housing, the pivot ear being configured for pivotable attachment to a mounting bracket configured to couple the first end of the housing to the first component;
   wherein a first shroud that is integral with the pivot ear extends past the first end of the housing and covers at least part of the cable;
   wherein the pivot ear comprises a lower end connected to the first end of the housing and an upper surface opposite the lower end;
   wherein a channel is formed as an indentation in the upper surface of the pivot ear and in an upper surface of the first shroud;
   wherein the channel is configured to receive the cable; and
   wherein as the housing pivots with respect to the mounting bracket, the cable is guided within the channel over the upper surfaces of the pivot ear and the first shroud.

2. The linear actuator of claim 1, wherein the housing comprises a longitudinal side surface connecting the first and second ends of the housing; and
   wherein the linear actuator further comprises a second shroud that is an extension of the longitudinal side surface.

3. The linear actuator of claim 2,
   wherein the second shroud is aligned with the cable and the pivot ear and over the channel.

4. The linear actuator of claim 1, further comprising the mounting bracket, the mounting bracket comprising:
   a mounting flange configured to be coupled to the first component; and
   a clevis comprising a pair of forks pivotably coupled to the first end of the housing, wherein the cable is routed between the clevis forks and through an opening in the mounting flange; and
   a hood that extends from the mounting flange at least partially along the clevis forks so as to cover at least part of the cable.

5. The linear actuator of claim 4, wherein the mounting flange comprises a first face configured to be attached adjacent to the first component and an opposite second face; and
wherein the hood extends outwardly past the second face of the mounting flange.

6. The linear actuator of claim 1, wherein the linear actuator is a trim tab actuator, the first component is a boat, and the second component is a trim tab.

7. The linear actuator of claim 1, wherein the housing is defined in a longitudinal direction extending from the first end to the second end thereof and in a lateral direction extending from a front of the housing to a rear of the housing; and
   wherein the cable is guided within the channel over the upper surfaces of the pivot ear and the first shroud in both the longitudinal and lateral directions as the housing pivots with respect to the mounting bracket.

8. The linear actuator of claim 1, further comprising a bolt;
   wherein the pivot ear comprises a hole through which the bolt is inserted so as to pivotably connect the pivot ear to the mounting bracket; and
   wherein the upper surface of the pivot ear routes the cable around the bolt.

9. A linear actuator comprising:
   a mounting bracket comprising:
      a mounting flange configured to be coupled to a first component; and
      a clevis comprising a pair of forks;
   a housing having a first end configured to be pivotably coupled to the clevis forks;
   a rod configured to extend from a second end of the housing and configured to be coupled to a second component;
   a cable extending from the first end of the housing and routed between the clevis forks and through an opening in the mounting flange;
   a hood on the mounting bracket that extends from the mounting flange at least partially along the clevis forks so as to cover at least part of the cable;
   a pivot ear pivotably coupling the first end of the housing to the clevis forks; and
   a first shroud that is integral with the pivot ear and extends past the first end of the housing and covers at least part of the cable;
   wherein the pivot ear comprises a lower end connected to the first end of the housing and an upper surface opposite the lower end;
   wherein a channel is formed as an indentation in the upper surface of the pivot ear and in an upper surface of the first shroud;
   wherein the channel is configured to receive the cable; and
   wherein as the housing pivots with respect to the mounting bracket, the cable is guided within the channel over the upper surfaces of the pivot ear and the first shroud.

10. The linear actuator of claim 9, wherein the housing comprises a longitudinal side surface connecting the first and second ends of the housing; and
    wherein the linear actuator further comprises a second shroud that is an extension of the longitudinal side surface.

11. The linear actuator of claim 10,
    wherein the second shroud is aligned with the cable and the pivot ear and over the channel.

12. The linear actuator of claim 9, wherein the mounting flange comprises a first face configured to be attached adjacent to the first component and an opposite second face; and wherein the hood extends outwardly past the second face of the mounting flange.

13. The linear actuator of claim 9, wherein the linear actuator is a trim tab actuator, the first component is a boat, and the second component is a trim tab.

14. The linear actuator of claim 9, wherein the housing is defined in a longitudinal direction extending from the first end to the second end thereof and in a lateral direction extending from a front of the housing to a rear of the housing; and wherein the cable is guided within the channel over the upper surfaces of the pivot ear and the first shroud in both the longitudinal and lateral directions as the housing pivots with respect to the mounting bracket.

15. The linear actuator of claim 9, further comprising a bolt;

wherein the pivot ear comprises a hole through which the bolt is inserted so as to pivotably connect the pivot ear to the clevis forks of the mounting bracket; and wherein the upper surface of the pivot ear routes the cable around the bolt.

* * * * *